United States Patent
Lee et al.

(10) Patent No.: US 11,528,112 B2
(45) Date of Patent: Dec. 13, 2022

(54) METHOD AND APPARATUS FOR SUPPORTING UPLINK TRANSMISSION AND MBMS FOR A WTRU WITH REDUCED BANDWIDTH

(71) Applicant: InterDigital Patent Holdings, Inc., Wilmington, DE (US)

(72) Inventors: Moon-il Lee, Melville, NY (US);
Nobuyuki Tamaki, Melville, NY (US);
Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/780,384

(22) Filed: Feb. 3, 2020

(65) Prior Publication Data

US 2020/0244421 A1 Jul. 30, 2020

Related U.S. Application Data

(63) Continuation of application No. 15/504,205, filed on Feb. 15, 2017, now Pat. No. 10,554,365.

(51) Int. Cl.
*H04W 4/00* (2018.01)
*H04L 5/00* (2006.01)
(Continued)

(52) U.S. Cl.
CPC ........ *H04L 5/0053* (2013.01); *H04L 25/0224* (2013.01); *H04L 27/0008* (2013.01);
(Continued)

(58) Field of Classification Search
CPC ............... H04W 72/042; H04W 76/27; H04W 72/0446; H04W 36/0055; H04W 48/12;
(Continued)

(56) References Cited

U.S. PATENT DOCUMENTS

| 8,315,217 B2 | 11/2012 | Montojo et al. |
| 8,520,757 B2 | 8/2013 | Kishiyama et al. |
| (Continued) | | |

FOREIGN PATENT DOCUMENTS

| CN | 102958133 | 3/2013 |
| CN | 103379552 | 10/2013 |
| (Continued) | | |

OTHER PUBLICATIONS

Huawei et al., "Discussion on the resource allocation for low cost MTC UEs," 3GPP TSG RAN WG1 Meeting #76bis, R1-141119, Shenzhen, China (Mar. 31-Apr. 4, 2014).

(Continued)

*Primary Examiner* — Atique Ahmed
(74) *Attorney, Agent, or Firm* — Volpe Koenig

(57) ABSTRACT

A wireless transmit/receive unit (WTRU) is configured to determine a frequency location of a reduced frequency bandwidth within a full system frequency bandwidth for an uplink transmission. The reduced frequency bandwidth is based on a received MTC physical downlink control channel. The WTRU is configured to determine a frequency location of an uplink resource in a first subframe based on at least one of a subframe number of the first subframe, a transmission repetition number associated with the first subframe, or a coverage enhancement level of the WTRU. The WTRU is configured to send a physical uplink control channel (PUCCH) transmission in the uplink resource in the first subframe in a same frequency location in both slots of the first subframe. A format of the PUCCH transmission is limited to a subset of PUCCH formats available for a WTRU operating in the full system frequency bandwidth.

12 Claims, 8 Drawing Sheets

(51) Int. Cl.
| | | |
|---|---|---|
| *H04L 25/02* | (2006.01) | |
| *H04L 27/00* | (2006.01) | |
| *H04W 36/00* | (2009.01) | |
| *H04W 48/12* | (2009.01) | |
| *H04W 52/14* | (2009.01) | |

(52) U.S. Cl.
CPC ....... *H04W 36/0055* (2013.01); *H04W 48/12* (2013.01); *H04W 52/14* (2013.01)

(58) Field of Classification Search
CPC .... H04W 52/14; H04L 5/0053; H04L 1/1812; H04L 25/0224; H04L 27/0008
See application file for complete search history.

(56) References Cited

U.S. PATENT DOCUMENTS

| | | | |
|---|---|---|---|
| 8,718,003 | B2 | 5/2014 | Nam et al. |
| 9,370,021 | B2 | 6/2016 | Love et al. |
| 9,699,738 | B2 | 7/2017 | Ouchi et al. |
| 9,781,705 | B2 | 10/2017 | Takeda et al. |
| 9,877,290 | B2 | 1/2018 | Aiba et al. |
| 2009/0207793 | A1* | 8/2009 | Shen ............... H04L 5/0094 370/329 |
| 2010/0091708 | A1* | 4/2010 | Nishikawa ........ H04W 72/0413 370/328 |
| 2010/0142467 | A1* | 6/2010 | Tiirola ............. H04L 5/0053 370/329 |
| 2010/0271970 | A1* | 10/2010 | Pan ................. H04L 1/0029 370/252 |
| 2011/0228731 | A1* | 9/2011 | Luo ................. H04W 72/1268 370/329 |
| 2011/0243066 | A1* | 10/2011 | Nayeb Nazar ........ H04L 1/1671 370/328 |
| 2012/0046032 | A1* | 2/2012 | Baldemair ........ H04W 72/0413 455/434 |
| 2012/0327916 | A1* | 12/2012 | Ahn ................. H04L 1/1671 370/336 |
| 2013/0064119 | A1 | 3/2013 | Montojo et al. |
| 2013/0077582 | A1 | 3/2013 | Kim et al. |
| 2013/0089063 | A1* | 4/2013 | Yang ............... H04L 5/0044 370/329 |
| 2013/0094457 | A1 | 4/2013 | Seo et al. |
| 2013/0163536 | A1 | 6/2013 | Anderson et al. |
| 2013/0194908 | A1 | 8/2013 | Gao et al. |
| 2013/0322363 | A1 | 12/2013 | Chen et al. |
| 2014/0029533 | A1* | 1/2014 | Han ................. H04B 17/27 370/329 |
| 2014/0219202 | A1* | 8/2014 | Kim ................ H04W 72/0413 370/329 |
| 2014/0233469 | A1 | 8/2014 | Seo et al. |
| 2014/0307685 | A1 | 10/2014 | Takano |
| 2015/0085689 | A1 | 3/2015 | Vos |
| 2015/0131565 | A1* | 5/2015 | Nakashima .......... H04L 1/0026 370/329 |
| 2016/0165640 | A1 | 6/2016 | Yang et al. |
| 2017/0164350 | A1 | 6/2017 | Sun et al. |
| 2017/0180098 | A1 | 6/2017 | You et al. |

FOREIGN PATENT DOCUMENTS

| | | |
|---|---|---|
| EP | 2437401 B1 | 3/2020 |
| WO | 2013173673 A2 | 11/2013 |

OTHER PUBLICATIONS

Huawei et al., "Frequency hopping of PUCCH," 3GPP TSG RAN WG1 Meeting #81, R1-153210, Fukuoka, Japan (May 25-29, 2015).
Interdigital, "On PUCCH for MTC UE," 3GPP TSG RAN WG1 Meeting #80bis, R1-152126, Belgrade, Serbia (Apr. 20-24, 2015).
Interdigital, "PUCCH and UCI for MTC UE," 3GPP TSG RAN WG1 Meeting #81, R1-153249, Fukuoka, Japan (May 25-29, 2015).
Ipwireless Inc., "Backwards compatible support for reduced bandwidth LTE UEs," 3GPP TSG RAN WG1 Meeting #68, R1-120799, Dresden, Germany (Feb. 6-10, 2012).
NEC, "PUCCH for Rel-13 Low complexity MTC," 3GPP TSG RAN WG1 Meeting #80bis, R1-151558, Belgrade, Serbia (Apr. 20-24, 2015).
Panasonic, "Discussion and performance evaluation on PUCCH for MTC UEs," 3GPP TSG RAN WG1 Meeting #80bis, R1-151668, Belgrade, Serbia (Apr. 20-24, 2015).
Third Generation Partnership Project, "Technical Specification Group Radio Access Network; Study on provision of low-cost MTC UEs based on LTE; (Release 12)," 3GPP TR 36.888 V2.1.0, R1-132798 (May 2013).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Physical channels and modulation (Release 12)," 3GPP TS 36.211 V12.2.0 (Jun. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.6.0 (Jun. 2015).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.1.0 (Jun. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.5.0 (Jun. 2015).
Third Generation Partnership Project, "Technical Specification Group Radio Access Network; Evolved Universal Terrestrial Radio Access (E-UTRA); Physical layer procedures (Release 12),"3GPP TS 36.213 V12.2.0 (Jun. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.6.0 (Jun. 2015).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.2.0 (Jun. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.6.0 (Jun. 2015).
Third Generation Partnership Project, "Technical Specification Group Radio Access Network; Study on provision of low-cost Machine-Type Communications (MTC) User Equipments (UEs) based on LTE (Release 12)," 3GPP TR 36.888 V12.0.0 (Jun. 2013).
LG Electronics, "Details on SR repetition and SRS transmission for MTC UE," 3GPP TSG RAN WG1 #81, R1-152705, Fukuoka, Japan (May 25-29, 2015).
Samsung, "UCI Transmission from Low Cost UEs," 3GPP TSG RAN WG1 #81, R1-152836, Fukuoka, Japan (May 25-29, 2015).

* cited by examiner

METHOD AND APPARATUS FOR SUPPORTING UPLINK TRANSMISSION AND MBMS FOR A WTRU WITH REDUCED BANDWIDTH

CROSS REFERENCE TO RELATED APPLICATIONS

This application is a continuation of U.S. patent application Ser. No. 15/504,205 filed on Feb. 15, 2017, which was filed as the U.S. National Stage, under 35 U.S.C. § 371, of International Application No. PCT/US2015/045282 filed Aug. 14, 2015, which claims the benefit of U.S. Provisional Application No. 62/037,739, filed on Aug. 15, 2014, the contents of which are hereby incorporated by reference herein.

BACKGROUND

Due to cost and complexity issues, a low-cost wireless transmit and receive unit (WTRU) may have one more reduced capabilities as compared to regular (i.e., more complex) WTRUs. Low-cost WTRUs may be restricted by, for example, a reduced bandwidth, a single receiver mode (Rx), or a transport block size (TBS) restriction. Hence, methods and procedures may be needed to enable communication and proper operation to support the coexistence of low-cost WTRUs and regular WTRUs.

SUMMARY

In an embodiment, a method of for supporting uplink transmissions in a wireless transmit and receive unit (WTRU) operating on a reduced bandwidth of a system bandwidth is disclosed. The method may include: determining a frequency location of the reduced bandwidth within the system bandwidth for an uplink (UL) transmission; determining an UL resource for a physical uplink control channel (PUCCH) transmission within the determined frequency location of the reduced bandwidth; and sending a PUCCH in the determined reduced bandwidth and UL resource.

In an embodiment, wireless transmit/receive unit (WTRU) supporting uplink transmissions and multimedia broadcast multicast service (MBMS) while operating on a reduced bandwidth of a system bandwidth, is disclosed. The WTRU may include: circuitry configured to determine a frequency location of the reduced bandwidth within the system bandwidth for an uplink (UL) transmission; circuitry configured to determine an UL resource for a physical uplink control channel (PUCCH) transmission within the determined frequency location of the reduced bandwidth; and circuitry configured to send a PUCCH in the determined reduced bandwidth and UL resource.

BRIEF DESCRIPTION OF THE DRAWINGS

A more detailed understanding may be had from the following description, given by way of example in conjunction with the accompanying drawings wherein.

DETAILED DESCRIPTION

Embodiments described herein may include methods, systems, and apparatuses that support transmissions in wireless transmit and receive units (WTRUs) having reduced capabilities. It should be noted that hereinafter, the terms low-cost WTRU, LC-MTC, reduced capability WTRU, low-cost WTRU with reduced capability, limited capability WTRU, and low-cost WTRU with limited capability may be interchangeably used and are not intended to be limiting. Also, WTRU, regular Long Term Evolution (LTE) WTRU, LTE WTRU, legacy WTRU, WTRU without reduced capability, and WTRU without limited capability may be used interchangeably and are not intended to be limiting.

Figure 1A:
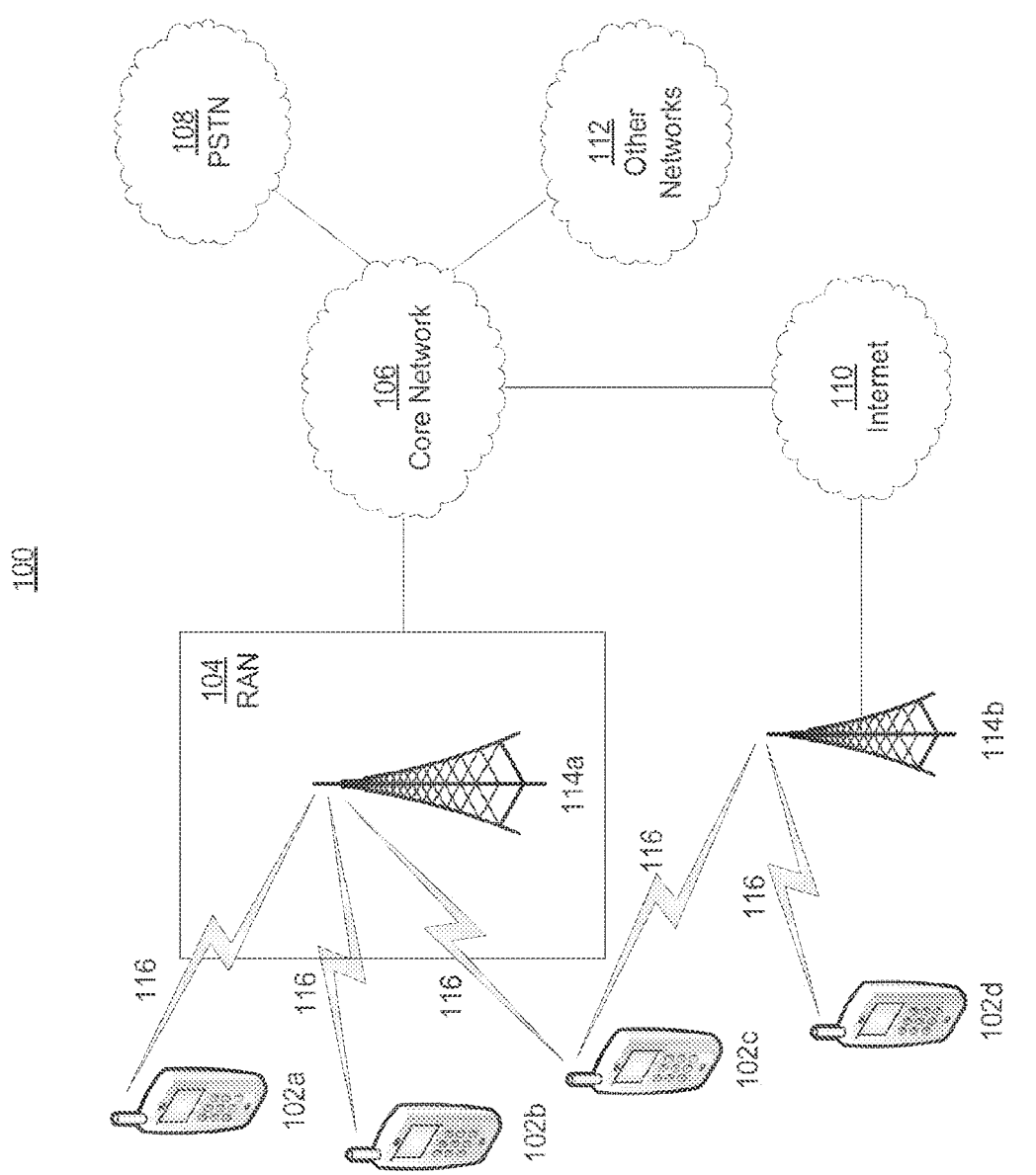
FIG. 1A is a system diagram of an example communications system in which one or more disclosed embodiments may be implemented.

Referring now to FIG. 1A, a diagram of an example communications system 100 in which one or more disclosed embodiments may be implemented is shown. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
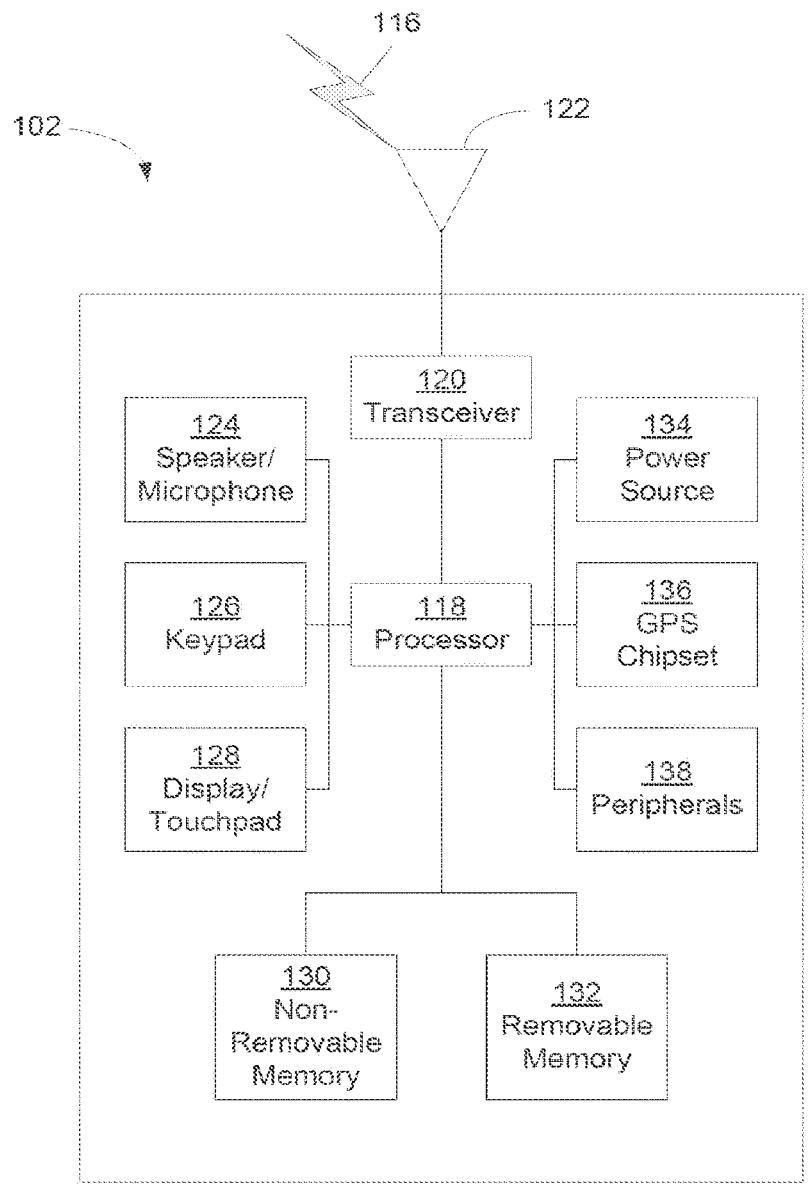
FIG. 1B is a system diagram of an example wireless transmit/receive unit (WTRU) that may be used within the communications system illustrated in FIG. 1A.

Referring now to FIG. 1B, a system diagram of an example WTRU 102 is shown. The WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
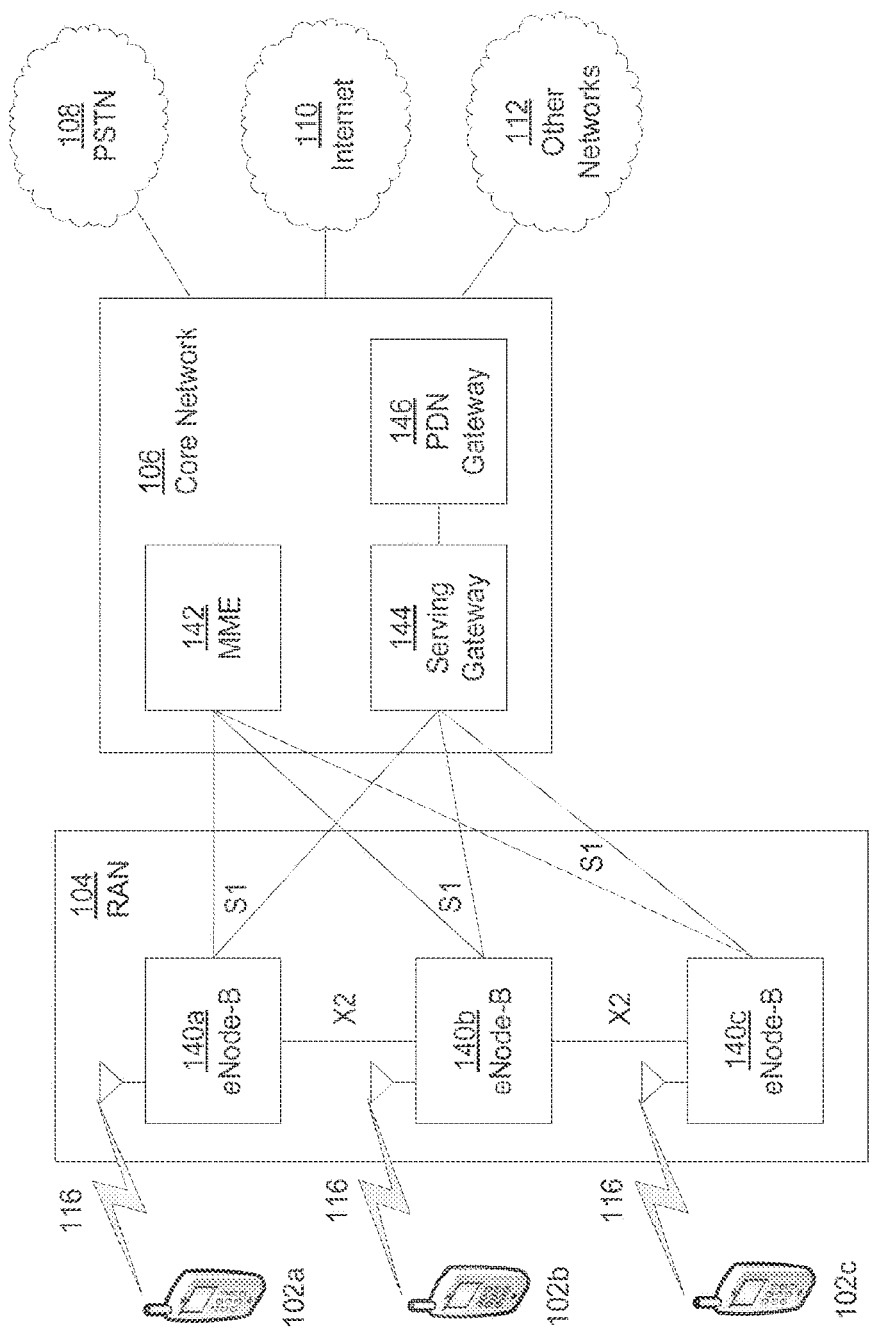
FIG. 1C is a system diagram of an example radio access network and an example core network that may be used within the communications system illustrated in FIG. 1A.

Referring now to FIG. 1C, a system diagram of the RAN 104 and the core network 106 according to an embodiment is shown. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In LTE communication, an uplink control channel, such as a Physical Uplink Control Channel (PUCCH), may transmit, may be used to transmit, may carry, and/or may include control signaling that may be independent of traffic data. The control signaling may include one or more of hybrid automatic repeat request (HARQ) acknowledge/negative acknowledgements (ACK/NACK), channel quality indicators (CQI), multiple input multiple output (MIMO) feedback, and/or scheduling requests for uplink transmission.

The physical resources used for PUCCH may depend on two parameters, $N_{RB}^{(2)}$ and $N_{cs}^{(1)}$, that may be given by higher layers. The variable $N_{RB}^{(2)} \geq 0$ may denote the bandwidth in terms of resource blocks that are available for use by PUCCH formats 2/2a/2b transmission in each slot. The variable $N_{cs}^{(1)}$ may denote the number of cyclic shifts used for PUCCH formats 1/1a/1b in a resource block used for a mix of formats 1/1a/1b and 2/2a/2b. The value of $N_{cs}^{(1)}$ may be an integer multiple of $\Delta_{shift}^{PUCCH}$ within the range of {0, 1, ..., 7}, where $\Delta_{shift}^{PUCCH}$ may be provided by higher layers. No mixed resource block is present if $N_{cs}^{(1)}=0$. At most one resource block in each slot may support a mix of formats 1/1a/1b and 2/2a/2b. Resources used for transmission of PUCCH formats 1/1a/1b, 2/2a/2b and 3 may be represented by the non-negative indices $$n_{PUCCH}^{(1,\tilde{p})}, n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

Figure 2:
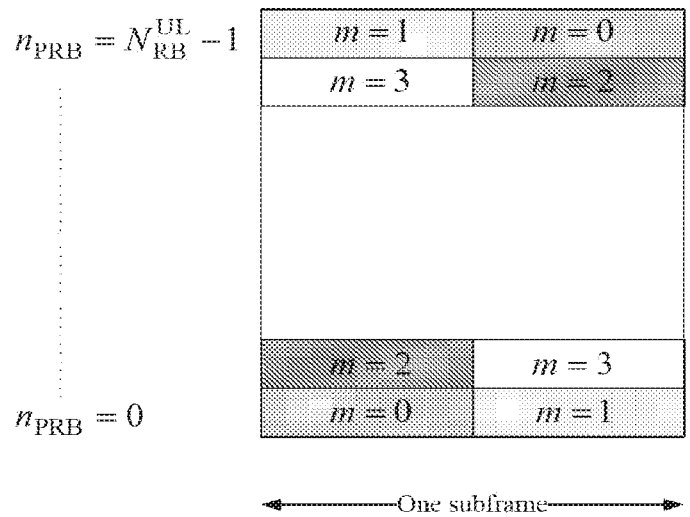
FIG. 2 is a mapping of modulation symbols for a physical uplink control channel (PUCCH)

Referring now to FIG. 2, a mapping of modulation symbols for the PUCCH is shown. The physical resource blocks to be used for transmission of PUCCH in slot $n_s$ may be given by $$n_{PRB} = \begin{cases} \left\lfloor \frac{m}{2} \right\rfloor & \text{if}(m + n_s \mod 2) \mod 2 = 0 \\ N_{RB}^{UL} - 1 - \left\lfloor \frac{m}{2} \right\rfloor & \text{if}(m + n_s \mod 2) \mod 2 = 1 \end{cases} \quad \text{(Equation 1)}$$

where the variable m depends on the PUCCH format. For formats 1, 1a and 1b (Equation 2)

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

and for formats 2, 2a and 2b $$m = \lfloor n_{PUCCH}^{(2,\tilde{p})} / N_{sc}^{RB} \rfloor \quad \text{(Equation 3)}$$

and for format 3

$$m = \lfloor n_{PUCCH}^{(3,\tilde{p})} / N_{SF,0}^{PUCCH} \rfloor. \quad \text{(Equation 4)}$$

In case of simultaneous transmission of sounding reference signal and PUCCH format 1, 1a, 1b or 3 when there is one serving cell configured, a shortened PUCCH format may be used where the last SC-FDMA symbol in the second slot of a subframe may be left empty.

A Frequency-division duplexing (FDD) HARQ-ACK procedure for a configured serving cell may include a HARQ-ACK transmission on two antenna ports (p ∈ [p₀, p₁]) that is supported for PUCCH format 1a/1b. For FDD and one configured serving cell, the WTRU 102 may use PUCCH resource $n_{PUCCH}^{(1,\tilde{p})}$ for transmission of HARQ-ACK in subframe n for p̃ mapped to antenna port p for PUCCH format 1a/1b as follows.

For a Physical Downlink Shared Channel (PDSCH) transmission indicated by the detection of a corresponding Physical Downlink Control Channel (PDCCH) in subframe n−4, or for a PDCCH indicating downlink semi-persistent scheduling (SPS) release in subframe n−4, the WTRU 102 may use $n_{PUCCH}^{(1,\tilde{p}_0)} = n_{CCE} + N_{PUCCH}^{(1)}$ for antenna port p₀, where $n_{CCE}$ is the number of the first Control Channel Element (CCE) (i.e., the lowest CCE index used to construct the PDCCH) used for transmission of the corresponding Downlink Control Information (DCI) assignment and $N_{PUCCH}^{(1)}$ is configured by higher layers. For two antenna port transmissions, the PUCCH resource for antenna port $p_1$ is given by $n_{PUCCH}^{(1,\tilde{p})} = n_{CCE} + 1 + N_{PUCCH}^{(1)}$.

For a PDSCH transmission on the primary cell where there is not a corresponding PDCCH detected in subframe n-4, the value of $n_{PUCCH}^{(1,\tilde{p})}$ may be determined according to higher layer configuration and pre-configured table of PUCCH resource values. For a WTRU 102 configured for two antenna port transmission, a PUCCH resource value in a pre-configured table of PUCCH resource values may map to two PUCCH resources. The first PUCCH resource $n_{PUCCH}^{(1,\tilde{p}_0)}$ may be for antenna port $p_0$ and the second PUCCH resource $n_{PUCCH}^{(1,\tilde{p}_1)}$ may be for antenna port $p_1$. Otherwise, the PUCCH resource value may map to a single PUCCH resource $n_{PUCCH}^{(1,\tilde{p}_0)}$ for antenna port $p_0$.

Figure 3:
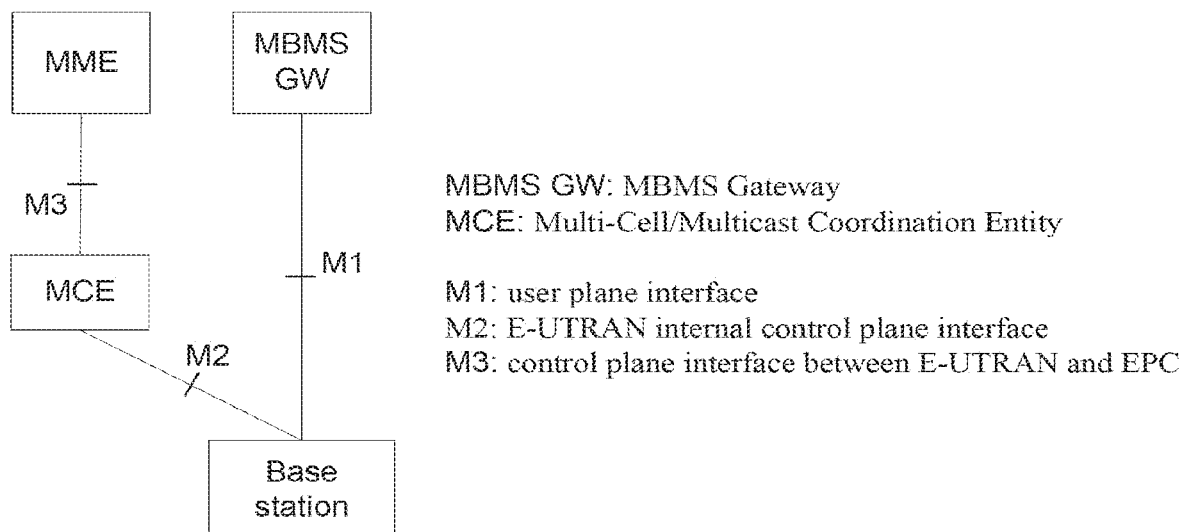
FIG. 3 is a logical network architecture for an Evolved Multimedia Broadcast/Multicast Service (eMBMS)

Referring now to FIG. 3, a logical network architecture for an Evolved Multimedia Broadcast/Multicast Service (eMBMS) is shown. The Multi-cell/multicast Coordination Entity (MCE) may provide the admission control and radio resources used by the base stations 114a, 114b in a multi-cast-broadcast single-frequency network (MBSFN) area for MBMS transmissions. The establishment and allocation of radio bearers as well as physical radio resources for MBMS may be coordinated by this entity. The MBMS GW may provide IP multicast functionality to forward MBMS user data to the base stations 114a, 114b in a coordinated manner. The M1, M2, and M3 may provide the control plane interface for MBMS between the entities involved in MBMS.

Regarding access stratum aspects, a MBSFN area may define a set of cells which coordinate the transmission of MBMS related data for one or more MBMS services. In an embodiment, a base station 114a, 114b may belong to up to 8 MBSFN areas.

MBMS control information, such as and as such Multicast Control Channel (MCCH), and data, such as Multicast Traffic Channel (MTCH), may be transmitted in a MBSFN subframe as defined in SIB2 of the cell. In each MBSFN subframe, a single Physical Multicast Channel (PMCH) may be transmitted that carries one MBMS related transport channel (MCH), which in turn multiplexes 1 MCCH and multiple MTCH logical channels. The multiplexing information of MCCH/MTCH may be provided in the MAC header of the MCH.

A single MCH transport channel may be transmitted onto a single PMCH in one MBSFN subframe. The transport format for the MCH is fixed and specified in broadcast information from the base station 114a, 114b.

The WTRU 102 may configure for reception of a specific MBMS service with the following steps. The WTRU 102 may receive SIB2 for MBSFN subframe configuration. The WTRU 102 may then receive SIB13 to obtain knowledge on how to receive the MCCH for this particular MBSFN area. Next, the WTRU 102 may receive the MCCH to obtain knowledge about the CSA period, CSA pattern, and MSP for the service of interest. Then, the WTRU 102 may receive the MSI at the beginning of each MSP. This may provide the terminal with information on which subframes the service of interest can be found in.

The MCCH which carries MBMS configuration information may be transmitted periodically in a MBSFN subframe, as defined for the MBSFN area in SIB13. The information included in MCCH may be changed from time to time by the base station 114a, 114b. In order to indicate the changes of MCCH to MBMS a receiving WTRU 102, it may transmit an 8-bit bitmask via PDCCH masked M-RNTI using DCI format 1C. The 8-bit bitmask may indicate the MBSFN area for which the MCCH has been changed. The changes to MCCH may take place at the beginning of the next MCCH modification period, as configured in SIB13.

Hereafter, the reduced uplink bandwidth may be referred to as an uplink bandwidth in which a low-cost WTRU may transmit uplink signals. In an embodiment, the uplink reduced bandwidth may be consecutive 6 PRBs located within a system bandwidth. The 6 PRBs may be replaced with any numbers such as $N_r$ PRBs where $N_r < 100$. The uplink reduced bandwidth may be interchangeably used as frequency location of the uplink reduced bandwidth, uplink frequency location of the low-cost WTRU, and a set of uplink PRBs for a low-cost WTRU with reduced bandwidth.

A PUCCH resource may be provided and/or used in a reduced bandwidth. A PUCCH for some legacy WTRUs may be located in at both of the band edges of the full system bandwidth in a subframe. For example, the PUCCH resource may be located at physical resource block (PRB) #0 and PRB #49 for a 10 MHz system bandwidth, which may contain a total of 50 PRBs.

In contrast, a low-cost WTRU may have limited capabilities, such as a reduced bandwidth, and may not be able to access or transmit the PUCCH resource at the edges of a larger bandwidth (e.g., 10 MHz). For example, a low-cost WTRU may operate only within a small number of PRBs (e.g., 6 PRBs) out of the total number of PRBs in a subframe (e.g., 50 PRBs). The small number of PRBs may not overlap with the PUCCH resource at the band edges of the legacy WTRUs.

In an embodiment, a PUCCH resource for low-cost WTRUs (LC-PUCCH resource) may be located in one or both band edges of a reduced bandwidth that is supported by the low-cost WTRUs. It should be noted that the LC-PUCCH resource may be intended and provided for use by another WTRU and still be consistent with this disclosure. The terms reduced and limited (e.g., reduced bandwidth and limited bandwidth) may be used interchangeably. Reduced bandwidth may refer to a reduced bandwidth in the uplink (and/or downlink). Reduced bandwidth may be with respect to the uplink (and/or downlink) bandwidth of a cell (e.g., a serving cell of a reduced bandwidth WTRU). A WTRU which may behave in a manner consistent with a reduced bandwidth WTRU may be considered a reduced bandwidth WTRU. System bandwidth may be used to represent the system uplink and/or downlink bandwidth. The terms system, cell, base station, and eNB may be used interchangeably.

Figure 4:
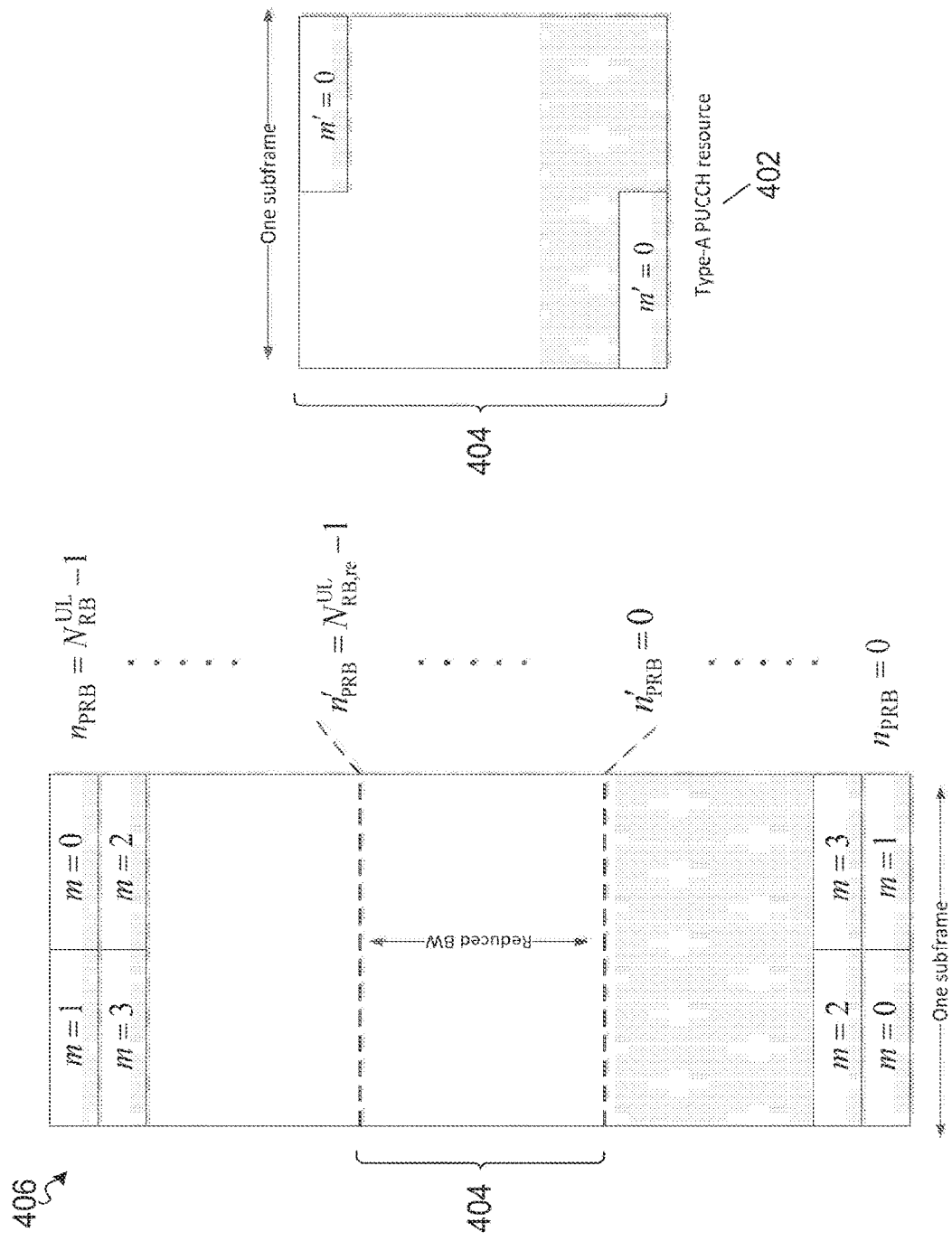
FIG. 4 is an example of a Type-A low-cost physical uplink control channel (LC-PUCCH) resource allocation in a reduced bandwidth of a low-cost wireless transmit and receive unit (WTRU)

Referring now to FIG. 4, an example of a LC-PUCCH resource allocation in a reduced bandwidth 404 is shown. The reduced bandwidth may correspond to the bandwidth supported by a low-cost WTRU. For exemplary purposes, the example LC-PUCCH resource is referred to as a Type-A LC-PUCCH resource 402. In an embodiment, the Type-A LC-PUCCH resource 402 may be located in both band edges of the reduced bandwidth 404. The reduced bandwidth 404 may be defined or predefined as a certain subset of PRBs (e.g., the center 6 PRBs) of a total system bandwidth 406. The total system bandwidth may be the uplink bandwidth (e.g., full uplink bandwidth) supported by or used by the cell providing the LC-PUCCH resource. The Type-A LC-PUCCH resource 402 may be located in both band edges of the certain subset of PRBs and may use slot hopping. A Type-A LC-PUCCH resource 402 allocation may be the same as a legacy PUCCH resource (e.g., for legacy WTRUs) when the reduced bandwidth 404 and the total system bandwidth 406 are the same.

It should be noted that hereinafter the term PRB-pair may refer to two PRBs paired within a subframe, wherein a first PRB may be located in a first slot of a subframe and a second PRB may be located in a second slot of the subframe. If a slot hopping is used, the two PRBs paired may be located in a different frequency. If a slot hopping is not used for a PRB-pair, the two PRBs may be located in a same frequency in the subframe.

In FIG. 4, the $n'_{PRB}$ denotes a physical resource block number within the reduced bandwidth 404 and the $N_{RB,re}^{UL}$ denotes an uplink reduced bandwidth configuration. As an example, if the reduced bandwidth 404 is defined as 6 PRBs, then $N_{RB,re}^{UL}=6$ and $n'_{PRB} \in \{0, 1, 2, 3, 4, 5\}$. In an embodiment, the location of the reduced bandwidth 404 within the system bandwidth 406 may be predefined. In another embodiment, the location of the reduced bandwidth 404 within the system bandwidth 406 may be defined as a function of one or more of following parameters: subframe number; slot number; system frame number (SFN); WTRU-ID, such as Cell Radio Network Temporary Identifier (C-RNTI); frequency location of an Enhanced Physical Downlink Control Channel (EPDCCH); starting Control Channel Element (CCE) number of associated PDCCH; starting Enhanced CCE (ECCE) number of associated EPDCCH; and physical Cell ID. It should be noted that the terms downlink control channel, physical downlink control channel (PDCCH) enhanced physical downlink control channel (EPDCCH), and MTC physical downlink control channel (M-PDCCH) may be interchangeably used. In addition, the terms CCE, enhanced CCE (ECCE), and MTC CCE (MCCE) may be used interchangeably.

In another embodiment, the location of the reduced bandwidth 404 within the system bandwidth 406 may be defined with a predefined hopping pattern. The reduced bandwidth 404 may be configured via higher layer signaling, such as via a Master Information Block (MIB) or a System Information Block (SIB).

Figure 5:
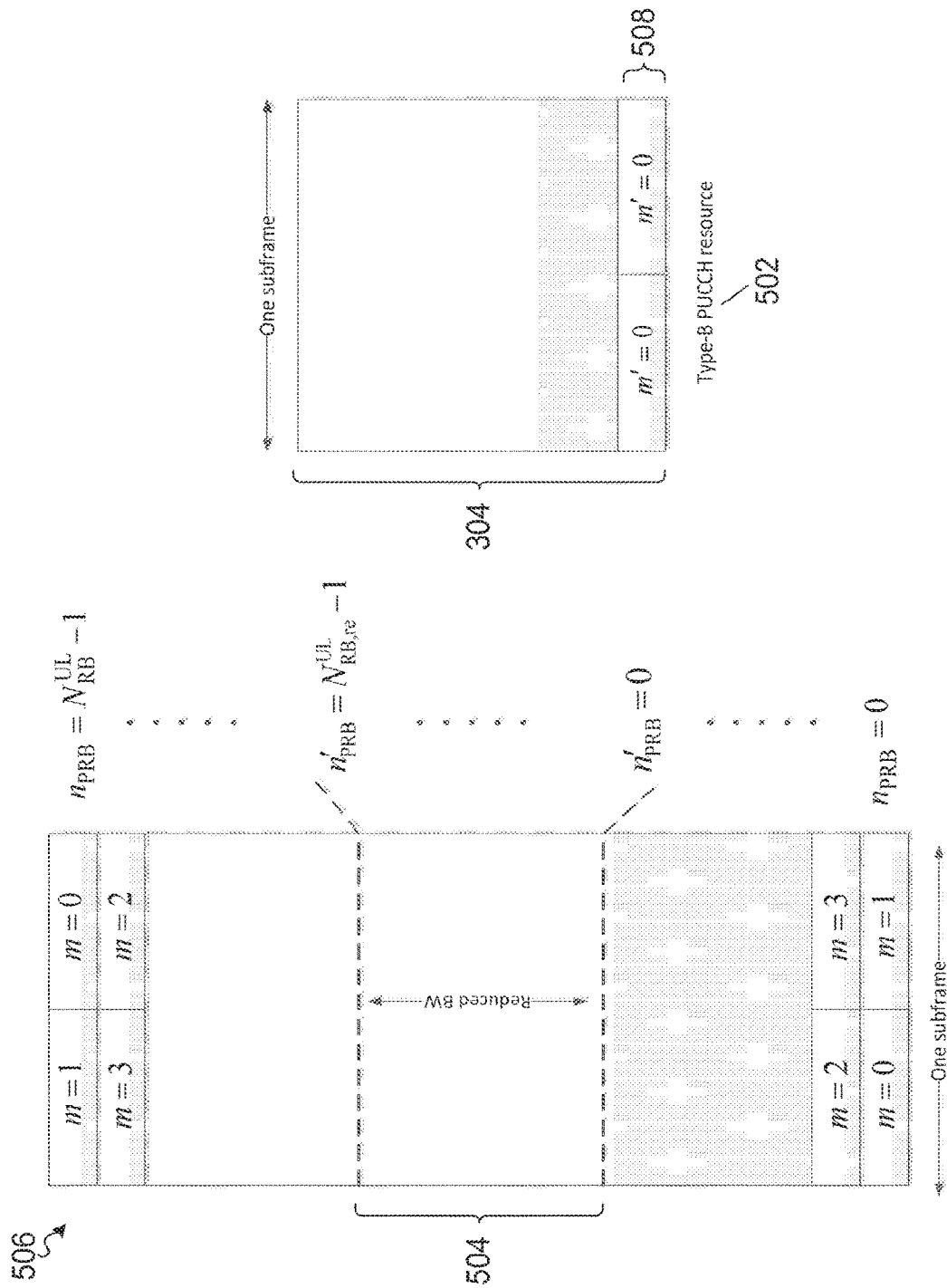
FIG. 5 is an example of a Type-B LC-PUCCH resource allocation in a reduced bandwidth of a low-cost WTRU.

Referring now to FIG. 5, another example of a LC-PUCCH resource allocation in a reduced bandwidth 504 is shown. The reduced bandwidth 504 may correspond to the bandwidth supported by a low-cost WTRU. For exemplary purposes, the example LC-PUCCH resource is referred to as a Type-B LC-PUCCH resource. In an embodiment, the Type-B LC-PUCCH 502 resource may be defined without slot hopping within the reduced bandwidth 504. The Type-B LC-PUCCH resource 502 may be or include a PRB-pair 508 located in the same frequency within the reduced bandwidth 504. The reduced bandwidth 504 may be defined or predefined as a certain subset of PRBs (e.g., center 6 PRBs) of a total system bandwidth 506. The Type-B LC-PUCCH resource 502 may be located in a band edge of the certain subset of PRBs.

In FIG. 5, the $n'_{PRB}$ denotes a physical resource block number within the reduced bandwidth 504 and the $N_{RB,re}^{UL}$ denotes an uplink reduced bandwidth configuration. As an example, if the reduced bandwidth 504 is defined as 6 PRBs, then $N_{RB,re}^{UL}=6$ and $n'_{PRB} \in \{0, 1, 2, 3, 4, 5\}$. In an embodiment, the location of the reduced bandwidth 504 within the system bandwidth 506 may be predefined. In another embodiment, the location of the reduced bandwidth 504 within the system bandwidth 506 may be defined as a function of one or more of following parameters: subframe number; slot number; system frame number (SFN); WTRU-ID, such as C-RNTI; frequency location of a PDCCH or EPDCCH; starting CCE number of associated PDCCH; starting ECCE number of associated EPDCCH; and physical Cell ID. In another embodiment, the location of the reduced bandwidth 504 within the system bandwidth 506 may be defined with a predefined hopping pattern. The reduced bandwidth 504 may be configured via higher layer signaling, such as via a MIB or a SIB.

Referring to the Type-B LC-PUCCH 504, the PRB-pair 508 located in the same frequency may be used as, or for, a LC-PUCCH resource. Although the PRB-pair 508 is shown at one edge of the reduced bandwidth 504, embodiments are considered in which the PRB-pair 508 is located at an opposite edge of the reduced bandwidth 504. In an embodiment, one edge of the reduced bandwidth 504 may correspond to the first PRB of the PRB-pair and the other edge of the reduced bandwidth 504 may correspond to the second PRB of the PRB-pair. In an embodiment, the PRB-pair 508 may be located at any location within the reduced bandwidth 504. The location of the PRB-pair 508 may be defined or configured by higher layer signaling, an indicator in the Downlink Control Information (DCI) associated with the PUCCH (e.g., LC-PUCCH) transmission, or as a function of the starting CCE (or ECCE) number for the PDCCH (or EPDCCH) associated with the LC-PUCCH transmission.

Figure 6:
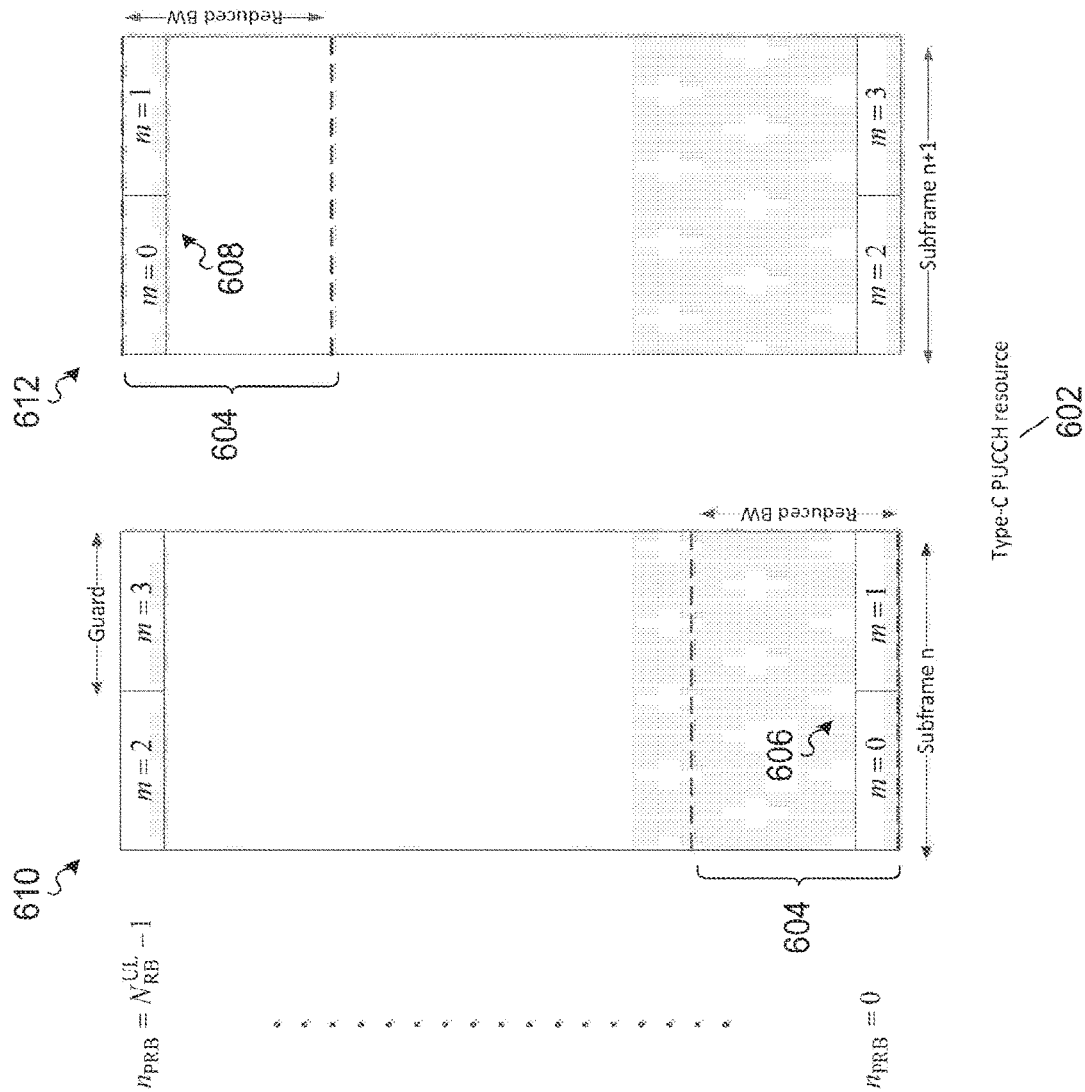
FIG. 6 is an example of a Type-C LC-PUCCH resource allocation in a reduced bandwidth of a low-cost WTRU.

Referring now to FIG. 6, another example of a LC-PUCCH resource allocation in a reduced bandwidth 604 is shown. The reduced bandwidth 604 may correspond to the bandwidth supported by a low-cost WTRU. For exemplary purposes, the example LC-PUCCH resource is referred to as a Type-C LC-PUCCH resource 602.

Referring to the Type-C LC-PUCCH 602, a PRB-pair may be located over two or more subframes of the transmission. Here, a first PRB 606 (denoted m=0) in the first slot of the subframe 610 (denoted subframe n) and a second PRB 608 (denoted m=0) 608 in the first slot of the subframe 612 (denoted subframe n+1) may be used as a PRB-pair for the Type-C LC-PUCCH 602. In another example, a first PRB 606 in the first slot of the subframe 610 and a second PRB 608 in the second slot of the subframe 612 may be used as a PRB-pair for the Type-C LC-PUCCH 602. In another example, the first PRB 606 may be in the second slot of the subframe 610 and the second PRB 608 may be in the second slot of the subframe 612, and together may be used as a PRB-pair for the Type-C LC PUCCH 602.

In an embodiment, the PRB-pair in the Type-C LC-PUCCH 602 may be located in both band edges of the system bandwidth. For example, the first PRB 606 may be located in the first PRB ($n_{PRB}=0$) of the system bandwidth in the first subframe 610 and the second PRB may be located in the last PRB ($n_{PRB}=N_{RB}^{UL}-1$) of the system bandwidth in the second subframe 612.

In an embodiment, an offset may be used, for example to avoid PUCCH resource collision between legacy-PUCCH and the Type-C LC-PUCCH 602. For example, the first PRB 606 may be located in the first PRB of the system bandwidth (e.g., $N_{RB}^{UL}$ PRBs) with an offset (e.g., $n_{PRB}=\Delta_{RB}$) in the first subframe 610 and the second PRB 608 may be located in the last PRB of the system bandwidth (e.g., $N_{RB}^{UL}$ PRBs) with an offset (e.g., $n_{PRB}=N_{RB}^{UL}-1-\Delta_{RB}$) in the second subframe 612. The offset $\Delta_{RB}$ may be configured via higher layer signaling (e.g., via MIB, SIB, and/or RRC signaling). The offset $\Delta_{RB}$ may be defined as a function of a higher layer parameter for legacy-PUCCH resource configuration. The offset $\Delta_{RB}$ may be defined as a function of at least one of following parameters: bandwidth available for use by PUCCH formats 2/2a/2b for legacy WTRUs (e.g., $N_{RB}^{(2)}$); number of cyclic shifts used for mixed format (e.g. $N_{CS}^{(1)}$);

and $N_{PUCCH}^{(1)}$. In an embodiment, the PUCCH resources may be shared between legacy-PUCCH and Type-C LC-PUCCH 602.

In an embodiment, two or more LC-PUCCH resource allocation types may be defined and/or configured and/or used. The LC-PUCCH resource type may be selected and/or used based on or according one or more of a LC-PUCCH transmission mode, an uplink transmission mode, a Physical Uplink Shared Channel (PUSCH) resource allocation type, higher layer configuration and/or dynamic indication.

A localized LC-PUCCH transmission mode and a distributed LC-PUCCH transmission mode may be defined. One of the LC-PUCCH transmission modes may be configured, selected, and/or indicated via higher layer signaling or dynamic signaling. A low-cost WTRU may select and/or use a LC-PUCCH resource type according to or at least based on the LC-PUCCH transmission mode.

A localized uplink transmission mode and a distributed uplink transmission mode may be defined. One of the uplink transmission modes may be configured via higher layer signaling or dynamic signaling. A WTRU may select and/or use a LC-PUCCH resource type according to, or at least based on, the uplink transmission mode.

For LC-PUSCH allocation, hopping may or may not be activated. A low-cost WTRU may select and/or use a LC-PUCCH resource type according to or at least based on whether LC-PUSCH hopping is activated. For example, if LC-PUSCH hopping is activated, the Type-A LC-PUCCH resource may be used. If PUSCH hopping is not activated, the Type-B LC-PUCCH resource may be used for LC-PUCCH resource allocation.

The LC-PUCCH resource type may be used according to, or at least based on, a higher layer configuration. A broadcast signal or system information (e.g., SIB) may configure or indicate the LC-PUCCH resource allocation type to be used. Higher layer RRC signaling (e.g., broadcast or dedicated) may be used to configure or indicate the LC-PUCCH resource type for a low-cost WTRU and/or for the cell. A low-cost WTRU may select and/or use a LC-PUCCH resource type according to, or at least based, on received broadcast and/or higher layer signaling.

The LC-PUCCH resource type may be used according to, or at least based on, a dynamic indication. The indicator may be provided or included in a DCI associated with the LC-PUCCH transmission. A low-cost WTRU may select and/or use a LC-PUCCH resource type according to or at least based on the indicator.

In an embodiment, a subset of PUCCH formats may be supported in, by, or for the LC-PUCCH. For example, PUCCH formats 1/1a/1b may be supported in the LC-PUCCH. The PRB resource allocation for PUCCH formats 1/1a/1b in the LC-PUCCH may be defined without the resource allocation for PUCCH format 2/2a/2b as follows:

$$m = \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + \left\lceil \frac{N_{cs}^{(1)}}{8} \right\rceil$$ (Equation 5)

$$c = \begin{cases} 3 & \text{normal cyclic prefix} \\ 2 & \text{extended cyclic prefix} \end{cases}$$

The PUCCH index in the single component carrier case may be defined as follows:

$$n_{PUCCH}^{(1,\tilde{p}0)} = n_{CCE}$$ (Equation 6)

A WTRU 102 may transmit a PUCCH (or a PUCCH format) in a LC-PUCCH resource. A WTRU 102 may determine a LC-PUCCH resource and/or type, for example based on definition, configuration, and/or indication, and may transmit a PUCCH in the determined LC-PUCCH resource using the determined LC-PUCCH type.

Figure 7:
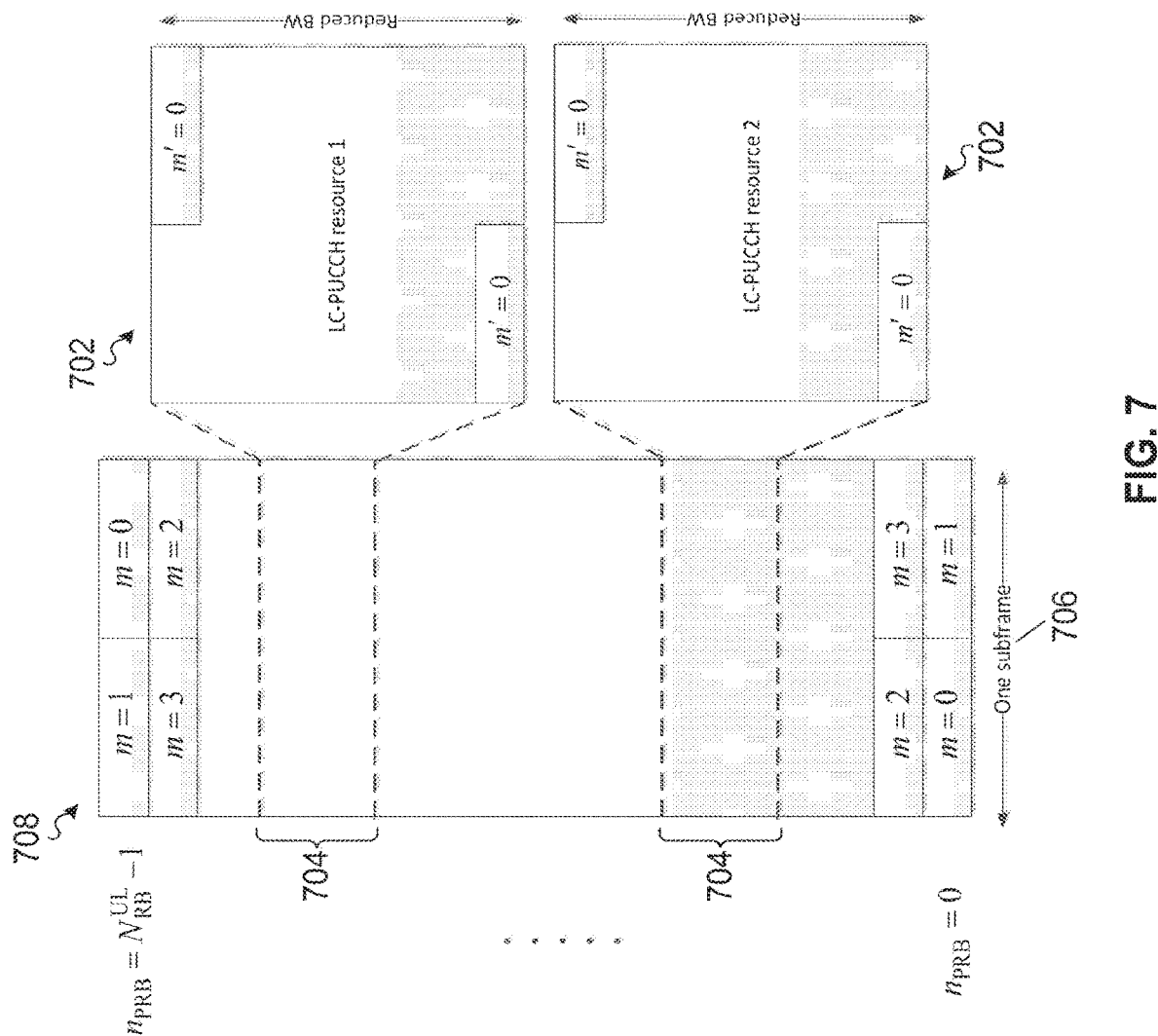
FIG. 7 illustrates multiple LC-PUCCH resource configurations.

Referring now to FIG. 7, multiple LC-PUCCH resource configurations are shown. In an embodiment, two or more LC-PUCCH resources 702 may be configured in a cell-specific manner. A low-cost WTRU may transmit PUCCH in one of the configured LC-PUCCH resources 702 in a subframe 706.

A LC-PUCCH resource 702 may be defined as a set of uplink PRBs which may correspond to the reduced bandwidth 704 of a low-cost WTRU. For example, if the reduced bandwidth 704 supported by a low-cost WTRU is a certain number of PRBs (e.g., 6 PRBs), then a LC-PUCCH resource 702 may be defined as the certain number of PRBs (e.g., 6 PRBs).

In an embodiment, two or more LC-PUCCH resources 702 may be defined in different sets of uplink PRBs which may be non-overlapped in the subframe 706. In an example, a primary LC-PUCCH resource 702 may be defined in a center frequency band. The set of PRBs for a LC-PUCCH resource 702 may be defined with a small number PRBs (e.g., 6 PRBs). The primary LC-PUCCH resource 702 may be defined in the center PRBs (e.g., center 6 PRBs) within the system bandwidth 708. A secondary LC-PUCCH resource 702 may be configured via higher layer signaling. In an example, an offset value (e.g., a frequency offset in PRBs from the PRBs for primary LC-PUCCH resource) may be signaled to indicate the location of the secondary LC-PUCCH resource 702. In an embodiment, one or more secondary LC-PUCCH resources 702 may be configured. The offset may be defined as a number of PRBs.

In an embodiment, two or more LC-PUCCH resources 702 may be configured via higher layer signaling. If the higher layer signaling (or configuration) is not available or not provided, a default LC-PUCCH resource 702 may be used. The default LC-PUCCH resource 702 may be predefined in a fixed location or defined as a function of at least one of physical cell-ID, WTRU-ID, subframe number, and slot number. Two or more LC-PUCCH resources 702 may be defined in a different set of uplink PRBs which may be fully or partially overlapped in the subframe.

In an embodiment, a low-cost WTRU may be configured with at least one of the LC-PUCCH resources 702 (e.g., cell-specific LC-PUCCH resources) for PUCCH transmission. The configured LC-PUCCH resource 702 may be considered as a WTRU-specific LC-PUCCH resource 702.

If a LC-PUCCH resource 702 is defined as the cell-specific low-cost PUCCH resource 702, the WTRU-specific LC-PUCCH resource 702 may be the same as the cell-specific LC-PUCCH resource 702. Additional configuration may not be needed or used to identify the WTRU-specific LC-PUCCH resource 702.

The WTRU-specific LC-PUCCH resource 702 may be configured or indicated via higher layer signaling, for example, if two or more LC-PUCCH resources 702 are defined as cell-specific LC-PUCCH resources 702. The WTRU-specific LC-PUCCH resource 702 may be indicated dynamically. An indicator may be carried in the DCI associated with the PUCCH transmission. The WTRU-specific LC-PUCCH resource 702 may be determined as a function of at least one of: WTRU-ID (e.g. C-RNTI); subframe number; SFN; frequency location of EPDCCH; and starting ECCE number of the associated EPDCCH.

In an embodiment, the LC-PUCCH resource 702 may be configured in a subset of uplink subframes, for example, within the reduced bandwidth 704.

One or more cell-specific LC-PUCCH resources 702 may be configured in some or all of the uplink subframes within the reduced bandwidth 704. A subset of the cell-specific LC-PUCCH resources 702 may be used for WTRU-specific LC-PUCCH resources 702. A low-cost WTRU may be configured with and/or use the subset of LC-PUCCH resources, which may be WTRU-specific 702. A low-cost WTRU may be may be configured to transmit PUCCH in only a WTRU-specific LC-PUCCH resource 702. If a WTRU-specific LC-PUCCH resource 702 is only available in a subset of the uplink subframes, HARQ bundling and/or multiplexing may be used. One or more downlink subframes may be associated (e.g., for DL HARQ process feedback) with an uplink subframe that contains a WTRU-specific LC-PUCCH resource. One or more HARQ-ACK information that corresponds to the associated downlink subframes (and/or HARQ processes) may be bundled and/or multiplexed for transmission (e.g., PUCCH transmission in a LC-PUCCH resource) in the uplink subframe containing the WTRU-specific LC-PUCCH resource 702.

The WTRU-specific LC-PUCCH resource 702 may be configured by an eNB or cell, and/or may be determined by the low-cost WTRU. One or more WTRU-specific LC-PUCCH resources 702 may be configured via higher layer signaling. One or more WTRU-specific LC-PUCCH resources 702 may be determined as a function of at least one of WTRU-ID (e.g. C-RNTI), subframe number, SFN, frequency location of EPDCCH, and starting ECCE number of the associated EPDCCH. The WTRU-specific LC-PUCCH resource 702 may be indicated dynamically via associated EPDCCH (e.g., via a DCI).

A WTRU, such as a low-cost WTRU or a WTRU supporting or using coverage enhancement, may transmit LC-PUCCH with repetitions. The repetition number may be determined based on the coverage enhancement (CE) level. It should be noted that the terms CE level and repetition number may be substituted for each other and still be consistent with this disclosure. The first transmission in a transmission with subsequent repetitions may be included or counted as one of the repetitions.

One or more CE levels may be used in a system. Number of repetitions or repeated transmissions may be represented by $N_{rep}$. For example, a CE level such as CE level-0 may be used for normal coverage. For normal coverage, $N_{rep}$ may be 1 to correspond to a single transmission with no additional repetitions. There be one or more CE levels with repetition, for example CE level-1 (e.g., $N_{rep}=x1$), CE level-2 (e.g., $N_{rep}=x2$), and CE level-3 (e.g., $N_{rep}=x3$) that may be used for coverage enhancement. Three levels are provided as an exemplary and non-limiting example. The variables x1, x2, and x3 may be positive integer numbers where x3>x2>x1. The number of CE levels supported in the system is not limited to a certain number. The numbering and ordering of the CE levels is also for example and not intended to be limiting.

In an embodiment, a LC-PUCCH type may be determined based on a CE level. For example, Type-A LC-PUCCH may be used for a lower CE level (e.g., one or more of CE level-0, CE level-1, and/or CE level-2). Type-B LC-PUCCH may be used for a higher CE level than the Type-A LC-PUCCH may be used for. For a LC-PUCCH transmission, a low-cost WTRU may determine the LC-PUCCH type based at least on CE level and transmit the LC-PUCCH in the LC-PUCCH resource of the determined type.

The WTRU-specific LC-PUCCH resource may be determined by, for example, the low-cost WTRU, as a function of at least one of: a CE-level, number of repetitions, a repetition number in $N_{rep}$ (e.g. n-th repetition out of Nrep repetitions), WTRU-ID (e.g. C-RNTI), subframe number, SFN, frequency location of EPDCCH, and a starting ECCE number of the associated EPDCCH. A low-cost WTRU may transmit a LC-PUCCH (e.g., a LC-PUCCH repetition) in the LC-PUCCH resource of the determined type.

In an example, a low-cost WTRU may use one LC-PUCCH type for repetition numbers in $N_{rep}$ beginning with 1 and ending with n (e.g., for repetitions 1 through 10 for $N_{rep}=20$) and another LC-PUCCH type for repetition numbers in $N_{rep}$ beginning with n+1 through the last repetition (e.g., for repetitions 11-20 for $N_{rep}=20$).

The frequency location of the WTRU-specific LC-PUCCH resource may be same during $N_x$ subframes when repetition is used with a repetition number Nrep. The WTRU-specific LC-PUCCH resource may be determined based on one or more parameters described herein for the first subframe of every $N_x$ subframes. In an example, $N_x$ may be a predefined value or may be configured via higher layer signaling. In another example, the Nx may be determined as a function of $N_{rep}$ or CE level. The $N_x$ may be a number smaller than $N_{rep}$ or the $N_x$ may be a number determined irrespective of the $N_{rep}$ used.

Although legacy-PUCCH resources may not collide with sounding reference signals (SRSs) since they are typically located on the band edges of the system bandwidth, the LC-PUCCH resource 702 may collide with SRS since it may be located in the reduced bandwidth 704. In order to avoid collisions, a low-cost WTRU may use a shortened PUCCH format in the cell-specific SRS subframes irrespective of the simultaneous ACK/NACK and SRS transmissions. For example, the last LC-PUCCH symbol in a subframe may not be transmitted if a low-cost WTRU may use a shortened LC-PUCCH format.

For example, the low-cost WTRU may receive SoundingRS-UL-Config which may include SoundingRS-UL-ConfigCommon and SoundingRS-UL-ConfigDedicated. The SoundingRS-UL-ConfigCommon may include the cell-specific SRS configuration related information. The SoundingRS-UL-ConfigDedicated may include the WTRU-specific SRS configuration related information. The low-cost WTRU may receive the SoundingRS-UL-ConfigCommon and read the cell-specific SRS configuration information while the low-cost WTRU may not follow ackNackSRS-simultaneousTransmission field in the SoundingRS-UL-ConfigCommon and assume that ackNackSRS-simultaneousTransmission is always activated. In this case, one or more of following parameters may apply.

A low-cost WTRU may use shortened PUCCH format always in the cell-specific SRS subframe irrespective of the simultaneous A/N and SRS transmission configuration if the uplink system bandwidth is larger than a certain bandwidth (e.g., 6 PRBs). If the uplink system bandwidth is equal to the certain bandwidth (e.g., 6 PRBs), the low-cost WTRU may follow the simultaneous ACK/NACK and SRS transmission configuration indicated by ackNackSRS-SimultaneousTransmission. The certain bandwidth may be predefined as the bandwidth supported by a certain WTRU category or a certain WTRU with limited capability. The certain bandwidth may be dependent on WTRU capability.

A low-cost WTRU may use shortened PUCCH format always in the cell-specific SRS subframe irrespective of the simultaneous ACK/NACK and SRS transmission configuration if the uplink system bandwidth is larger than reduced bandwidth 704 for the low-cost WTRU. If the uplink system bandwidth is the same as the reduced bandwidth 704 for the low-cost WTRU, the low-cost WTRU may follow the simultaneous ACK/NACK and SRS transmission configuration indicated by ackNackSRS-SimultaneousTransmission.

A low-cost WTRU may use shortened PUCCH format in the cell-specific SRS subframe irrespective of the simultaneous ACK/NACK and SRS transmission configuration according to the PUCCH format. For example, a low-cost WTRU may use shortened PUCCH format for the PUCCH format 1/1a/1b while the low-cost WTRU may drop the PUCCH in the cell-specific SRS subframe for the PUCCH format 2/2a/2b/3.

In an embodiment, a low-cost WTRU specific ackNack-SRS-SimultaneousTransmission may be transmitted, which may be independently transmitted from the legacy WTRU ackNackSRS-SimultaneousTransmission. For example, a low-cost WTRU specific sounding RS configuration (e.g., SoundingRS-UL-ConfigMTC) may be introduced in the SoundingRS-UL-Config so that the low-cost WTRU may read the low-cost WTRU specific sounding RS configuration which may include the simultaneous ACK/NACK and SRS transmission in the reduced bandwidth 704. In this case, one or more of following parameters may apply.

The low-cost WTRU specific sounding RS configuration (e.g. SoundingRS-UL-ConfigMTC) may include at least one of the followings: cell-specific SRS bandwidth within the reduced bandwidth 704 (e.g. srs-BandwidthConfigMTC); cell-specific SRS subframe configuration within the reduced bandwidth 704 (e.g. srs-SubframeConfigMTC); and simultaneous ACK/NACK and SRS transmission in the reduced bandwidth 704 (e.g. ackNackSRS-SimultaneousTransmissionMTC).

The low-cost WTRU specific sounding RS configuration may be transmitted in the broadcasting channel transmitted in the downlink reduced bandwidth 704.

In an embodiment, a LC-PUCCH resource 702 may not be configured in the cell-specific SRS subframe. In an example, the LC-PUCCH resource 702 may be located in the subframe without SRS. Therefore, a low-cost WTRU may assume that LC-PUCCH 702 resource is not available in the cell-specific SRS subframes. In this case, one or more of following parameters may apply.

ACK/NACK bundling or multiplexing may be used if the multiple ACK/NACK need to be transmitted in an uplink subframe due to the limited LC-PUCCH resources 702. For example, if a low-cost WTRU received a PDSCH in the subframe n and the subframe n+4 in the uplink is configured as cell-specific SRS subframe, then the ACK/NACK may be bundled or multiplexed with other PDSCH and transmitted in uplink subframe other than subframe n+4.

A low-cost WTRU may be configured to either transmit shortened PUCCH format in cell-specific SRS subframe always or drop/bundle/multiplex ACK/NACK in the cell-specific SRS subframe.

In another embodiment, a low-cost WTRU may drop/bundle/multiplex PUCCH transmission in the cell-specific SRS subframe if simultaneous ACK/NACK and SRS transmission is not activated. In an example, a low-cost WTRU may assume that LC-PUCCH resource 702 may not be available in the cell-specific SRS subframe if simultaneous ACK/NACK and SRS transmission is not activated which may be indicated from ackNackSRS-SimultaneousTransmission.

The use of shortened LC-PUCCH format in the cell-specific SRS subframe may be determined based on the CE level used by the low-cost WTRU. The low-cost WTRU may use a shortened LC-PUCCH format in the cell-specific SRS subframe if the low-cost WTRU is operating in a certain coverage enhancement level for LC-PUCCH transmission. For example, the shortened LC-PUCCH format may be used in the cell-specific SRS subframe if a low-cost WTRU is operating a lower CE level which may require a smaller repetition number (e.g. $N_{rep}$=x1). In contrast, a shortened LC-PUCCH format may not be used in the cell specific SRS subframe if a low-cost WTRU is operating a higher CE level which may require a larger repetition number (e.g. $N_{rep}$=x2, wherein x2>x1).

Due to the reduced bandwidth 704, the fixed uplink resource (e.g., center 6 RBs) may result in scheduling restriction for the low-cost WTRUs since all low-cost WTRUs may need to share the reduced bandwidth 704 resource.

In an embodiment, the uplink reduced bandwidth 704 may be defined in a WTRU-specific manner within the system bandwidth 708. Therefore, two or more low-cost WTRUs may have different reduced bandwidth 704 location in the same network. For example, a low-cost WTRU may be configured or assigned with the first set of 6 PRBs as a reduced bandwidth 704 while another low-cost WTRU may be configured or assigned with another 6 PRBs non-overlapped with the first set of 6 PRBs.

In an example, the uplink band for low-cost WTRU may be configured or assigned with following procedures.

A low-cost WTRU may first receive the uplink band information from SIB-1 (e.g. freqBandIndicator) and SIB-2 (e.g. ul-Bandwidth, ul-CarrierFreq).

The low-cost WTRU may receive reduced bandwidth 704 related information via higher layer signaling. For example, the low-cost WTRU specific uplink carrier frequency information (e.g. ul-CarrierFreqMTC) may be carried via a broadcasting signaling (e.g. SIB-x, where the x may be but not limited to 1 or 2). Alternatively, the starting PRB index for the reduced bandwidth 704 may be indicated via the broadcasting signaling. If the uplink reduced bandwidth 704 information is not provided, a low-cost WTRU may assume that the uplink reduced bandwidth 704 is the center 6 PRBs of the system bandwidth.

If the uplink reduced bandwidth 704 is the same as the center 6 PRBs, the Physical Random Access Channel (PRACH) resource configuration may be commonly used for a legacy WTRU and a low-cost WTRU. Therefore, the low-cost WTRU may use the same PRACH resource configuration for legacy WTRUs. If partitioned PRACH resource information, which may be a subset of the PRACH resources for legacy WTRUs, is provided for low-cost WTRU, the low-cost WTRU may only use the partitioned PRACH resources.

If the uplink reduced bandwidth 704 is different from the center 6 PRBs and the PRACH resource configuration is provided for the uplink reduced bandwidth 704, the low-cost WTRU may use the PRACH resource configuration within the uplink reduced bandwidth 704 for PRACH preamble transmission in the contention based random access. If there is no uplink reduced bandwidth 704 specific PRACH resource configuration, the low-cost WTRU may assume that the same PRACH resource configuration for legacy WTRUs may be used for the uplink reduced bandwidth 704.

During or after RACH procedures, a low-cost WTRU may be configured with another uplink reduced bandwidth 704. This reduced bandwidth 704 may be different from the uplink reduced bandwidth 704 configured from the broadcasting signaling (e.g. SIB-x, where the x could be but is not limited to 1 or 2). In an example, the WTRU-specific uplink reduced bandwidth 704 configuration message may be carried via RACH msg2 or msg4. Alternatively, the WTRU-specific uplink reduced bandwidth 704 configuration message may be carried via dedicated RRC message or medium access control (MAC) control element (CE) after RACH procedure. If no WTRU-specific uplink reduced bandwidth 704 is configured for a low-cost UE, the UE may assume that the UE-specific uplink reduced bandwidth 704 is the same as the uplink reduced bandwidth 704 configured via broadcasting signaling.

In another example, two or more uplink reduced bandwidths 704 may be defined via broadcasting signaling and a low-cost WTRU may determine which uplink reduced bandwidth 704 the low-cost WTRU will camp on. For example, a low-cost WTRU may receive information about the two or more uplink reduced bandwidth 704, and the low-cost WTRU may transmit a PRACH preamble on the one of the configured uplink reduced bandwidth 704. If the low-cost WTRU finishes the RACH procedures in the uplink reduced bandwidth 704 on which the WTRU transmitted a corresponding PRACH preamble, the low-cost WTRU may assume that the uplink reduced bandwidth 704 is the WTRU-specific uplink reduced bandwidth.

In an embodiment, the low-cost WTRU may receive the uplink reduced bandwidth 704 information from SIB-1 and SIB-2. In another embodiment, the low-cost WTRU may receive the uplink reduced bandwidth 704 related information via higher layer signaling. The higher layer signaling may include at least two or more uplink reduced bandwidths 704. In an example, two or more uplink carrier frequency information (e.g. ul-CarrierFreqMTC-1 and ul-CarrierFreqMTC-2) may be carried via broadcasting signaling. In another example, two or more starting PRB index (e.g. ul-rbStartRB-1 and ul-rbStartRB-2) for the uplink reduced bandwidths 704 may be informed via broadcasting signaling. If one of the uplink reduced bandwidths 704 is located in the center 6 PRBs, the associated information may not be provided via broadcasting signaling and the low-cost WTRU may assume that the center 6 PRBs may be used as default uplink reduced bandwidth.

The PRACH configuration information may be provided for the configured uplink reduced bandwidths 704. In an example, the PRACH configuration information for the legacy WTRU 102 may be reused for the configured uplink reduced bandwidths 704. In another example, a separate PRACH configuration information for each uplink reduced bandwidth 704 may be provided. Alternatively, a common PRACH configuration for each of the uplink reduced bandwidths 704 may be provided. In an embodiment, this common PRACH configuration may be different from the PRACH configuration for the legacy WTRU 102.

The low-cost WTRU may transmit a PRACH preamble in an uplink reduced bandwidth 704 based on the corresponding PRACH configuration. The low-cost WTRU may try to transmit a PRACH preamble in an uplink reduced bandwidth 704 at a time. If the low-cost WTRU does not receive the corresponding Random Access Response (RAR), the low-cost WTRU may try to transmit a PRACH preamble with higher power in the same uplink reduced bandwidth 704 until it reaches to the maximum transmit power. In an embodiment, the power increment level may be predefined. If the low-cost WTRU still doesn't receive the RAR for the PRACH preamble transmission with maximum transmit power, the low-cost WTRU may try to transmit a PRACH preamble in another reduced bandwidth 704. The low-cost WTRU may try to transmit a PRACH preamble in an uplink reduced bandwidth 704 at a time and the low-cost WTRU may attempt to transmit a PRACH preamble on two or more uplink reduced bandwidths 704.

If the low-cost WTRU receives an RAR corresponding to a specific uplink reduced bandwidth 704, the WTRU may transmit RACH msg3 in the corresponding uplink reduced bandwidth 704. Alternatively, the RAR may include the WTRU-specific uplink reduced bandwidth 704 the low-cost WTRU may use for RACH msg3 transmission.

In another embodiment, two or more reduced bandwidths 704 may be configured according to the uplink channel. For example, a set of PRBs may be defined or configured for PRACH transmission while another set of PRBs may be defined or configured as PUSCH/PUCCH transmission. In this case, one or more of following may apply.

The PRACH resource for low-cost WTRU may be defined in the center 6 PRBs in the subframe configured for PRACH transmission while another 6 PRBs located in other location which may be not overlapped with the center 6 PRBs may be used for PUSCH/PUCCH transmission.

The frequency location of the PRACH resource for low-cost WTRU may be predefined. As similar with the PRACH resources for the legacy WTRU, the frequency location of the PRACH resource for the low-cost WTRU may be the center 6 PRBs in the FDD system and up to six frequency locations of PRACH resource may be configurable in TDD system.

In an example in the TDD, the frequency location of PRACH resource may be fixed to one for the low-cost WTRU irrespective of the number of frequency locations configured for the PRACH resources. Alternatively, the frequency location of the PRACH resource for the low-cost WTRU may be non-overlapped frequency location for the PRACH resources for the legacy WTRU. If the system bandwidth is the same as the uplink reduced bandwidth 704, the PRACH resources may be commonly used for both legacy WTRUs and low-cost WTRUs.

The uplink reduced bandwidth 704 for the PUSCH/PUCCH may be indicated via a broadcasting signaling. If there is no signaling for the uplink reduced bandwidth 704 for the PUSCH/PUCCH, a low-cost WTRU may assume that the uplink reduced bandwidth 704 for PUSCH/PUCCH may be the center 6 PRBs.

The uplink reduced bandwidth 704 for the PUSCH/PUCCH may be defined as a function of the system bandwidth. In an example, if the system bandwidth is smaller than or equal to $N_{thresh}$, which may be a predetermined value, a low-cost WTRU may assume that the uplink reduced bandwidth 704 is located in the center 6 PRBs. In another example, if the system bandwidth is larger than $N_{thresh}$, a low-cost WTRU may assume that the uplink reduced bandwidth 704 is located in the set of 6 PRBs which as an offset from the center 6 PRBs, where the offset may be predefined or configured via higher layer signaling. Also, the offset may be cell common or WTRU-specific.

In an embodiment, the uplink reduced bandwidth 704 for the PRACH resource and PUSCH/PUCCH resources for low-cost WTRU may be configured. In another embodiment, the PRACH resource may be fixed to a center 6 PRBs while the set of PRBs for PUSCH/PUCCH may be configured in a WTRU-specific manner. The PRACH resource may be common for all low-cost WTRUs while the PUSCH/PUCCH resource (i.e., WTRU-specific reduced bandwidth location) may be configured in a WTRU-specific manner. The WTRU-specific PUSCH/PUCCH resource may be indicated in the RAR. For example, two or more set of PUSCH/PUCCH reduced bandwidth 704 resources may be configured as a cell-specific PUSCH/PUCCH reduced bandwidth 704 resources and one of them may be indicated in the RAR for msg3 transmission.

In another embodiment, different sets of PRBs may be defined or configured for PRACH, PUSCH, and PUCCH, respectively. Therefore, a low-cost WTRU may need to transmit PRACH preamble, PUSCH, and PUCCH in the different set of PRBs. A low-cost WTRU may need to transmit PUSCH and PUCCH in a different set of uplink PRBs. If a low-cost WTRU may need to transmit a PUSCH containing UCI, the uplink reduced bandwidth for PUSCH may be used.

Another issue with the use of reduced bandwidths 704 on low-cost WTRUs is that a base station 114a, 114b may have no knowledge about whether a Physical Multicast Channel (PMCH) or a Multimedia Broadcast Multicast Service (MBMS) is being received by the low-cost WTRU. A base station 114a, 114b may not know whether a MBMS service is specifically used by a low-cost WTRU. This may impact the ability of the low-cost WTRU to properly receive PMCH (and as such Multicast Control Channel (MCCH) and/or Multicast Traffic Channel (MTCH)) if the resources used for PMCH exceed the reduced bandwidth capability of the WTRU.

A base station 114a, 114b may be indicated by MBMS network entities such as the Multi-cell/multicast Coordination Entity (MCE) that a particular MBMS service and/or Multicast-broadcast single-frequency network (MBSFN) service area may be received by the low-cost WTRU. A low-cost WTRU may be indicated during MBMS service discovery and/or by a base station 114a, 114b that a MBMS service and/or MBSFN area may support reception by a low-cost WTRU. The following provides solutions for indicating such information to a base station 114a, 114b and/or a low-cost WTRU, and may be used in combination or individually.

For the following solutions, in support of the reduced capability WTRUs for a particular MBMS service, the MCE and base station 114a, 114b may allocate resources for MBMS data transmission on those resources that may be received by the reduced capability WTRUs. For example, in MBSFN subframes, an base station 114a, 114b may transmit PMCH which may carry MCCH and MTCH in resources that may be received by a reduced bandwidth WTRU, e.g., in the center 6 PRBs.

In an embodiment, the low-cost WTRU may receive a MBMS service level indicator. A low-cost WTRU may be indicated that a MBMS service may specifically for low-cost WTRUs. For example, the MBMS service may specifically be designated for reduced bandwidth WTRUs. A normal WTRU 102 may not be restricted to receive such MBMS service and may be rejected when trying to subscribe to the service. A low-cost WTRU may be indicated that a particular MBMS service may be accessed by a reduced capability WTRU, however, the service may not be exclusively consumed by reduced capability WTRUs. Alternatively, a low-cost WTRU may be indicated that a particular MBMS service may not be allowed reception by a low-cost WTRU. The low-cost WTRU may be denied reception upon attempting to subscribe to this type of MBMS service.

A low-cost WTRU may receive reduced capability support indication as part of the MBMS announcement and/or discovery process. For example, a low-cost WTRU may be indicated of this information as part of the User Service Description (USD) information. As part of the USD information, a low-cost WTRU may be indicated of MBMS service support for reduced capability WTRUs as part of the MBMS Feature Requirement List which is part of the USD. For example, a low-cost WTRU may subscribe to a MBMS service if the requirements indicate that reduced capability and/or reduced bandwidth feature is supported by that low-cost WTRU.

A base station 114a, 114b may indicate to a low-cost WTRU that a MBSFN area may support reception of MBMS by a reduced capability WTRU. For example, a base station 114a, 114b may transmit such indication in SIB13 along with other information regarding the MBSFN area. The support of reduced capability may be dynamic and changed by the MCE and base station 114a, 114b based on MBMS service that is transmitted in the MBSFN area or based on the capabilities of the low-cost WTRU that is subscribed to the MBMS service. Possibly, a base station 114a, 114b may change the indication of reduced capability WTRU support to support of normal WTRUs 102 when a particular MBSFN area no longer provides MBMS services targeted for reduced capability WTRUs. The change of such indication may be provided by the normal SIB modification procedure.

The base station 114a, 114b and/or the MCE may allocate one or more MBSFN subframes as indicated in SIB2 to support MBMS services to reduced capability WTRUs. A low-cost WTRU may be indicated one or more MBSFN subframes, for example in SIB2, available for reduced capability WTRUs along with the MBSFN subframe configuration. The reduced capability supporting MBSFN subframes may be allocated to one or more MBSFN areas as defined by the base station 114a, 114b and/or MCE, which may transmit control information and data for MBMS services supporting reduced capability WTRUs.

For example, a MCE and a base station 114a, 114b may allocate a set of MBMS services specific to reduced capability WTRUs to a MBSFN area defined by a certain group of cells that have a high density of such devices. The MCE may then schedule the transmission of control information and data for these MBMS services on pre-allocated subset of available MBSFN subframes, and additionally schedule the MBMS service transmissions based on a specific periodicity. During the MBSFN subframes allocated for reduced capability WTRUs, a base station 114a, 114b may then transmit PMCH, and optionally PDCCH, with MBMS Radio Network Temporary Identifier (M-RNTI) in a manner which may be received by the low-cost WTRU.

A base station 114a, 114b may receive an indication from the MCE to support (or not support) reduced capability WTRUs for a particular MBMS session, service and/or MBSFN area. For example, the base station 114a, 114b, based on this indication may transmit MCCH and MTCH on PMCH, for a particular MBSFN area or possibly for a particular PMCH or MBMS session. The base station 114a, 114b may determine, based on the scheduling information, which MBSFN subframes may be used to transmit a reduced bandwidth PMCH such that a reduced capability WTRU may be able to receive the PMCH properly.

The base station 114a, 114b may receive an indication from the MCE to support (or not support) for MBMS scheduling information. For example, a base station 114a, 114b may receive the indication to support reduced capability WTRUs as an additional information element in the M2-AP MBMS Scheduling Information message. Based on the received MCCH Update Time IE and the additional IE, the base station 114a, 114b may transmit the PDCCH with M-RNTI to indicate upcoming change to the MCCH in a reduced bandwidth PDCCH or possible EPDCCH. This may enable a low-cost WTRU that has subscribed to the particular MBMS service to properly receive the updated MCCH.

A low-cost WTRU may receive PMCH in one or more of MBSFN subframe associated with the MBSFN area targeted for the low-cost WTRU within the smaller bandwidth. In an example, the low-cost WTRU may receive PMCH in the subset of PRBs in the system bandwidth. In this embodiment, one or more of following parameters may apply.

When the low-cost WTRU decodes the PMCH, the $I_{MCS}$, which may be an indicator of modulation and coding scheme, for the PMCH may be configured by higher layer. The low-cost WTRU may use $I_{MCS}$ for the PMCH and a transport block size (TBS) table to determine the modulation order and TBS index. The TBS may be determined with the assumption that $N_{PRB}$ is equal to $N_{PRB,re}$ where $N_{PRB,re}$ may be the number of physical resource blocks (PRBs) for the reduced bandwidth, and $N_{PRB,re}$ may be smaller than $N_{PRB}$.

The frequency location of the PMCH in the MBSFN subframe may be predefined to a fixed location (e.g. center 6 PRBs), signaled via higher layer, or configured as a function of MBSFN area index.

When the low-cost WTRU monitors the MCCH change notification, if the system bandwidth is the same as the reduced bandwidth 704, the low-cost WTRU may monitor the PDCCH with the cyclic redundancy check (CRC) scrambled by the M-RNTI within the PDCCH common search space in an MBSFN subframe.

When the low-cost WTRU monitors the MCCH change notification, if the system bandwidth is larger than the reduced bandwidth 704, the low-cost WTRU may monitor PDCCH with the CRC scrambled by the M-RNTI within EPDCCH common search space.

When the low-cost WTRU monitors the MCCH change notification, the EPDCCH common search space for MCCH change notification may be located in the non-MBSFN region. Alternatively, the EPDCCH common search space for MCCH change notification may be located in the MBSFN region. Here, the EPDCCH common search space in the MBSFN region may be defined as an extended cyclic prefix irrespective of the CP length in the non-MBSFN region.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
    a receiver;
    a transmitter; and
    a processor, wherein:
    the receiver and the processor are configured to receive a system information block (SIB), wherein the SIB indicates an uplink bandwidth portion of an uplink system bandwidth;
    the receiver and the processor are configured to receive information via radio resource control (RRC) signaling, wherein the information received via RRC signaling includes information regarding a plurality of physical uplink control channel (PUCCH) resources and an indication whether to use slot frequency hopping;
    the receiver and the processor are further configured to receive downlink control information (DCI), wherein the DCI indicates one of the plurality of PUCCH resources; and
    the transmitter and the processor are configured, based on the indication whether to use slot frequency hopping, to send a first PUCCH transmission based on the indicated PUCCH resource in a first frequency resource in the uplink bandwidth portion in a first slot and a second PUCCH transmission based on the indicated PUCCH resource in a second frequency hopped resource in the uplink bandwidth portion, based on the bandwidth of the uplink bandwidth portion, in a second slot.

2. The WTRU of claim 1, wherein the information received via RRC signaling includes information regarding a pair of physical resource blocks for the frequency hopping.

3. The WTRU of claim 1, wherein the information received via RRC signaling includes an indication of repetitions for the PUCCH transmission, wherein the transmitter and the processor are further configured to repeat the first or second PUCCH transmission based on the indication of repetitions.

4. The WTRU of claim 1, wherein a symbol length of the first or second PUCCH transmission is based on a format of the PUCCH.

5. The WTRU of claim 1, wherein the RRC signaling indicates whether a PUCCH format is a short PUCCH format or a long PUCCH format.

6. The WTRU of claim 1, wherein the SIB is a SIB type 1.

7. A method implemented by a wireless transmit/receive unit (WTRU), the method comprising:
    receiving a system information block (SIB), wherein the SIB indicates an uplink bandwidth portion of an uplink system bandwidth;
    receiving information via radio resource control (RRC) signaling, wherein the information received via RRC signaling includes information regarding a plurality of physical uplink control channel (PUCCH) resource and an indication whether to use slot frequency hopping;
    receiving downlink control information (DCI), wherein the DCI indicates one of the plurality of PUCCH resources; and
    sending, based on the indication whether to use slot frequency hopping, a first PUCCH transmission based on the indicated PUCCH resource, in a first frequency resource in the uplink bandwidth portion in a first slot and a second PUCCH transmission based on the indicated PUCCH resource in a second frequency hopped resource in the uplink bandwidth portion, based on the bandwidth of the uplink bandwidth portion, in a second slot.

8. The method of claim 7, wherein the information received via RRC signaling includes information regarding a pair of physical resource blocks for the frequency hopping.

9. The method of claim 7, wherein the information received via RRC signaling includes an indication of repetitions for the PUCCH transmission, the method further comprising repeating the first or second PUCCH transmission based on the indication of repetitions.

10. The method of claim 7, wherein a symbol length of the first or second PUCCH transmission is based on a format of the PUCCH.

11. The method of claim 7, wherein the RRC signaling indicates whether a PUCCH format is a short PUCCH format or a long PUCCH format.

12. The method of claim 7, wherein the SIB is a SIB type 1.

* * * * *